United States Patent [19]

Obata et al.

[11] Patent Number: 5,552,590
[45] Date of Patent: Sep. 3, 1996

[54] OPTICAL INFORMATION READING APPARATUS HAVING MEANS FOR JUDGING LASER DETERIORATION

[75] Inventors: Kenzo Obata, Okazaki; Katsunori Goto, Handa, both of Japan

[73] Assignee: Nippondenso Co., Ltd., Kariya, Japan

[21] Appl. No.: 117,441

[22] Filed: Sep. 7, 1993

[30] Foreign Application Priority Data

Sep. 8, 1992 [JP] Japan .................................. 4-239496
Sep. 9, 1992 [JP] Japan .................................. 4-240718
May 27, 1993 [JP] Japan .................................. 5-126206

[51] Int. Cl.⁶ .................................................. G06K 7/10
[52] U.S. Cl. ................................................ 235/455; 235/472
[58] Field of Search .................................... 372/29, 34, 36, 372/38; 235/462, 472, 455; 340/635, 641, 664, 653; 315/65, 119, 127, 225

[56] References Cited

U.S. PATENT DOCUMENTS

| 4,387,297 | 6/1983 | Swartz et al. |
|---|---|---|
| 4,461,974 | 7/1984 | Chiu ............................................ 315/65 |
| 4,796,266 | 1/1989 | Banwell ...................................... 372/38 |
| 5,023,515 | 6/1991 | Olon ........................................... 315/88 |
| 5,117,098 | 5/1992 | Swartz . |
| 5,199,037 | 3/1993 | Aronowitz .................................. 372/31 |
| 5,334,826 | 8/1994 | Sato ............................................ 235/455 |

FOREIGN PATENT DOCUMENTS

| 52-18599 | 2/1977 | Japan ....................................... 315/119 |
|---|---|---|
| 56-140467 | 11/1981 | Japan . |
| 4280388 | 10/1992 | Japan . |

OTHER PUBLICATIONS

"Stabilization of CW Injection Lasers", RCA Technical Notes, Apr. 9, 1975, pp. 1–3, James P. Wittke, David R. Patterson, Ivan Ladany, Authors.

*Primary Examiner*—Donald T. Hajec
*Assistant Examiner*—Karl D. Frech
*Attorney, Agent, or Firm*—Cushman, Darby & Cushman

[57] ABSTRACT

An optical information reading apparatus comprises: a semiconductor laser (30); an optical scanning mechanism (50) for scanning bar code (90) using a laser beam emitted from the semiconductor laser (30); a photodetector (70) receiving a returning laser beam reflected at the bar code (90); information reading device (130, 140) for reading out information from the bar code on the basis of the returning laser beam received by the photodetector (70); sweep angle regulating mechanism (150, 180) for restricting a sweep angle of the laser beam used in a scanning operation of the optical scanning device (50) within a predetermined angle so as to scan only one bar code; an operational current detecting circuit (120) for detecting an operational current value of the semiconductor laser (30); and a deterioration judging device for making a judgement as to whether the semiconductor laser (30) is deteriorated or not on the basis of the operational current detected by the operational current value detecting circuit (120).

4 Claims, 11 Drawing Sheets

OPTICAL INFORMATION READING APPARATUS HAVING MEANS FOR JUDGING LASER DETERIORATION

BACKGROUND OF THE INVENTION

1. Field of the Invention

The present invention relates generally to an optical information reading apparatus capable of reading optical information from an information medium such as bar code, wherein a laser beam is used for scanning the information medium.

2. Description of the Prior Art

There are conventionally known numerous laser bar code readers. Among them, Japanese Unexamined Patent Application 56-140467/81 discloses a typical laser bar code reader. In this prior art, a semiconductor laser is used as a laser source. A laser beam emitted from this semiconductor laser is collimated by a collimator lens. The laser beam, collimated by the collimator lens, is then reflected by a mirror. This mirror is driven by a stepping motor so as to cause a reciprocative sweep motion repeated at a low-frequency speed. A bar code is scanned by the laser beam reflected at the mirror. The laser beam, reflection at the bar code, returns to the mirror. The returning laser beam, after reflected at the mirror, is converged by a converging lens so as to focus on a photodetector. A signal received by the photodetector is thereafter used to decode the bar code. The optical reading operation of the bar code is accomplished in this manner.

Such a laser bar code reader is aimed at a bar code, with a laser beam having a predetermined scanning angle. However, if two, one being necessary to detect and the other being unnecessary, different bar codes happen to be in the scanning zone of the laser beam at the same time, the unnecessary bar code will be erroneously detected together with the bar code really wanted to detect. If this other bar code is not required to be scanned, a wrong decode data will be obtained. This kind of error tends to occur in cases where numerous bar codes are concentrated within a small area.

In order to avoid this problem, it will be necessary to place the laser bar code reader as close to the bar code to be scanned as possible. This will, however, spoil the inherent advantage of the non-contact type portable laser bar code reader.

Furthermore, although the semiconductor laser is advantageous in reducing size, weight, and power consumption of the laser bar code reader, some problems will take place due to disadvantageous properties of semiconductor laser. The semiconductor laser is so weak against static electricity and voltage surges that various characteristics such as light emitting mode, current-optical output characteristics, and spectrum characteristics are easily deteriorated and the life of the semiconductor laser is shortened undesirably.

Therefore, it is feared that the semiconductor laser may accidentally die within a warranty term. The laser bar code reader is usually operable without any trouble even if the life of the semiconductor laser is reduced to a certain degree. Therefore, it is quite difficult to predict the semiconductor laser will soon be fatally wasted. Furthermore, once the semiconductor laser is installed in the laser bar code reader, it is usually difficult to check how the semiconductor laser is deteriorated. Although the components of the laser bar code reader may be disassembled to check the semiconductor laser, disassembling the laser bar code reader is not practical or recommended.

SUMMARY OF THE INVENTION

Accordingly, in view of above problems, an object of the present invention is to provide an optical information reading apparatus which is capable of varying a scanning angle of the laser beam in order to avoid failing in the scanning operation of an information medium.

In order to accomplish above purpose, a first aspect of the present invention provides an optical information reading apparatus comprising: a laser light source; optical scanning means for scanning an information medium by the use of a laser beam emitted from said laser light source; photo receiving means for receiving a returning laser beam reflected at said information medium; information reading means for reading out information from said information medium on the basis of said returning laser beam received by said photo receiving means; and sweep angle regulating means for restricting a sweep angle of said laser beam used in a scanning operation of said optical scanning means within a predetermined angle so as to scan only one information medium.

With this arrangement, the sweep angle regulating means automatically reduces the sweep angle of the laser beam so as to scan only one information medium in the case where a plurality of information mediums are located within an aimed scanning angle.

In other words, the present invention assures no failure in the scanning operation since the sweep angle of the laser beam is automatically adjusted to an angle suitable for scanning only one information medium. Therefore, the optical information reading apparatus can be operated even if it is placed fairly apart from the information medium to be scanned. Thus, the portability of the optical information reading apparatus is adequately preserved.

Another object of the present invention is to provide an optical information reading apparatus which is capable of detecting deterioration of a semiconductor laser in an ordinary operating condition.

In order to accomplish this purpose, a second aspect of the present invention provides an optical information reading apparatus comprising: a semiconductor laser emitting a laser beam; optical scanning means for scanning an information medium by the use of the laser beam emitted from said semiconductor laser; photo receiving means for receiving a returning laser beam reflected at said information medium; information reading means for reading out information from said information medium on the basis of said returning laser beam received by said photo receiving means; operational current detecting means for detecting an operational current value of said semiconductor laser; and deterioration judging means for making a judgement as to whether or not said semiconductor laser is deteriorated on the basis of the operational current value detected by said operational current detecting means.

With this arrangement, the operational current detecting means detects the operational current value of the semiconductor laser, and the deterioration judging means makes a judgement as to whether or not the semiconductor laser is deteriorated on the basis of the detected operational current value of the semiconductor laser. Therefore, when the semiconductor laser is damaged by static electricity or a voltage surge, the present invention enables an operator to know whether the semiconductor laser is fairly wasted or not even in a normal operating condition. As the construction of the present invention is very simple, cost will not increase.

It is preferable in this second aspect to correct the operational current in accordance with a temperature relating to the semiconductor laser.

Furthermore, in order to solve above problems at the same time, a third aspect of the present invention provides an optical information reading apparatus comprising: a semiconductor laser light source; optical scanning means for scanning an information medium by the use of a laser beam emitted from said laser light source; photo receiving means for receiving a returning laser beam reflected at said information medium; information reading means for reading out information from said information medium on the basis of said returning laser beam received by said photo receiving means; sweep angle regulating means for restricting a sweep angle of said laser beam used in a scanning operation of said optical scanning means within a predetermined angle so as to scan only one information medium; operational current detecting means for detecting an operational current value of said semiconductor laser; and deterioration judging means for making a judgement as to whether or not said semiconductor laser is deteriorated on the basis of the operational current value detected by said operational current detecting means.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, with reference to accompanying drawings, preferred embodiments of the present invention will be explained in detail.

Figure 1:
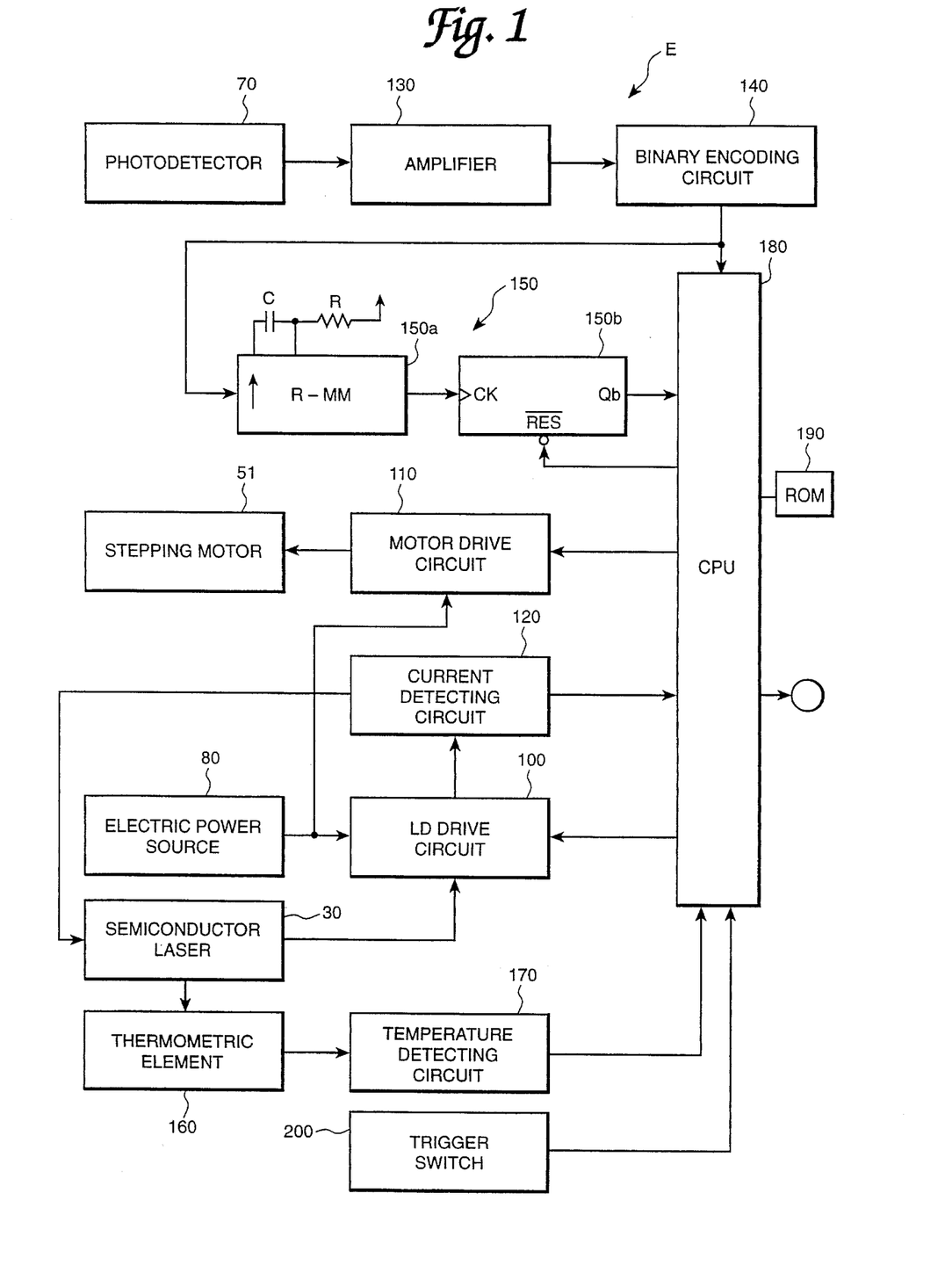
FIG. 1 is a schematic block diagram showing an electric control circuit of an optical information reading apparatus in accordance with the present invention.

A portable optical information reading apparatus in accordance with the present invention will be explained with reference to FIGS. 1 and 2. The optical information reading apparatus is basically constituted by a hand-held scanner S and an electric control circuit E.

The hand-held scanner S includes various optical components in a casing 10 having a head portion 10a. The head portion 10a accommodates an electronic circuit board 20. A semiconductor laser diode 30, a collimator lens 40, an optical scanning mechanism 50, a converging lens 60, and a photodetector 70 are mounted on the electronic circuit board 20, as shown in FIG. 2. Furthermore, the hand-held scanner S includes an electric power source 80 housed in a hand portion 10b of the casing 10.

The semiconductor laser diode 30 generates a laser beam in accordance with its operational current. The generated laser beam is emitted toward the collimator lens 40. The semiconductor laser diode 30 includes a photo diode serving as a laser output monitor. A laser beam entering from the semiconductor laser 30 into this photo diode has a characteristic of reducing its output power in proportion to deterioration of the semiconductor laser diode 30. A semiconductor laser diode, for example, TOSHIBA TOLD 9200, would be suitable for the semiconductor laser diode 30 used in this embodiment. The collimator lens 40 collimates the laser beam and transmits it to the optical scanning mechanism 50.

The optical scanning mechanism 50 consists of a stepping motor 51 and a flat-plate mirror 52. The stepping motor 51 is installed on the electronic circuit board 20 behind the collimator lens 40 with respect to the semiconductor laser diode 30. The stepping motor 51 has an output shaft protruding from the top thereof uprightly with respect to the electronic circuit board 20. The mirror 52 is coaxial with and supported on this output shaft of the stepping motor 51.

Figure 2:
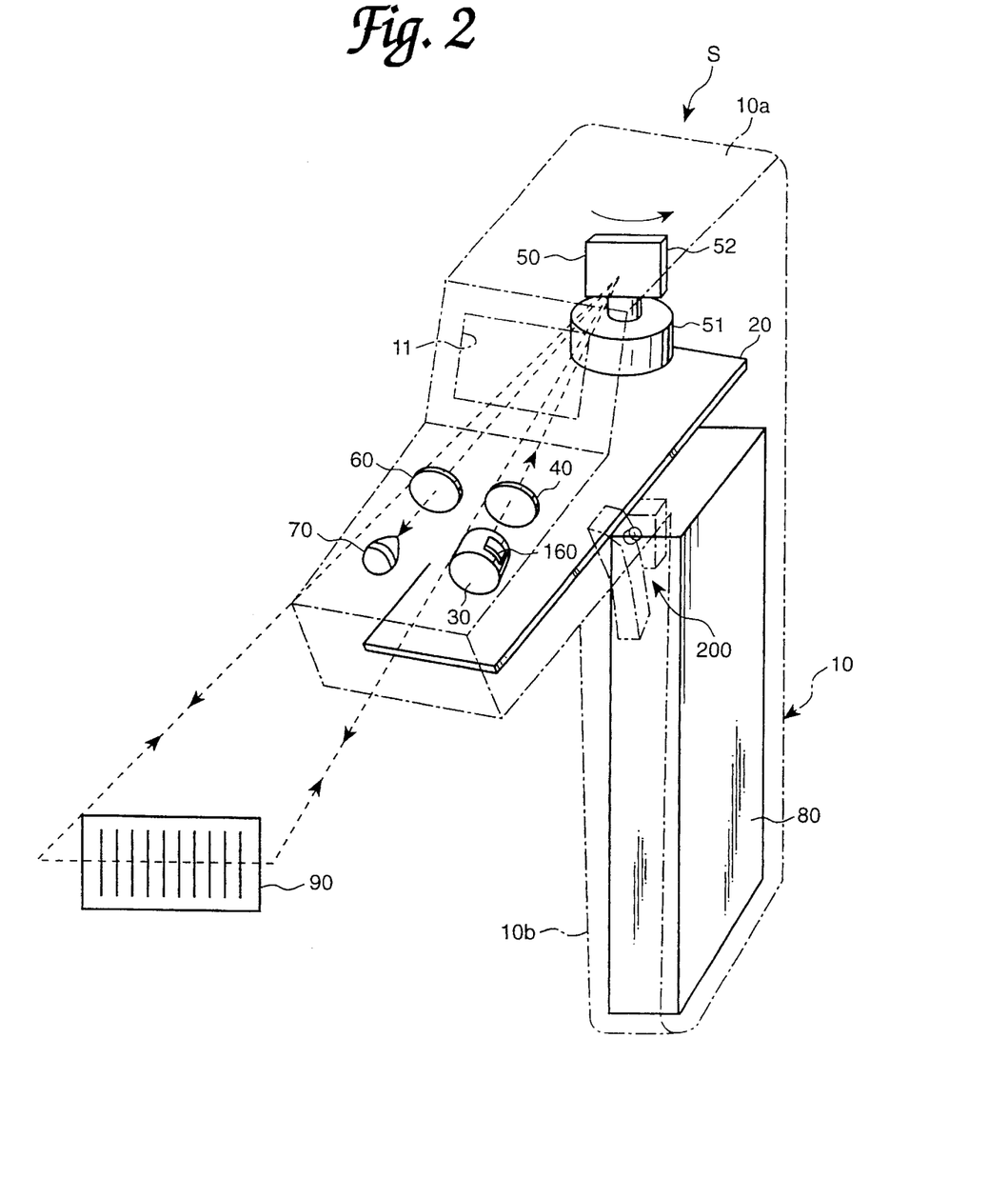
FIG. 2 is a perspective view showing a hand-held portable scanner in accordance with the present invention.

The mirror 52 is driven by the stepping motor 51 to cause a reciprocative swing motion at a low-frequency speed, in a direction of an arrow in FIG. 2 or in the opposite direction. Accordingly, the mirror 52 receives a laser beam transmitted from the collimator lens 40 and reflects it toward a bar code 90 through a window 11 provided on the head portion 10a of the casing 10. Thus, the scanning operation of the bar code 90 is carried out in synchronization with the swing motion of the mirror 52.

Furthermore, the mirror 52 receives a returning laser beam having been reflected at the bar code 90 and passing through the window 11. This returning laser beam is referred to as a bar code laser beam, hereinafter. The mirror 52 then reflects the bar code laser beam toward the converging lens 60. The converging lens 60 converges the bar code laser beam and focuses it onto the photodetector 70.

The photodetector 70, for example, constituted by a photo transistor, responds to the bar code laser beam converged from the converging lens 60 and generates a light detecting signal representative of a received light amount of the converged bar code laser beam.

The hand-held scanner S further includes a trigger switch 200, provided at an appropriate portion of the hand portion 10b. This trigger switch 200 is depressed by an operator in order to initiate the scanning operation using the mirror 52. Upon depression of the trigger switch 200, a mirror scanning signal is generated and fed to a micro computer (abbreviated as a combination of a CPU 180 and a ROM 190). This micro computer may be a one-chip micro computer, for example HITACHI H8/532, comprising A-D converter.

Next, the electronic control circuit E will be explained with reference to FIG. 1. A laser diode drive circuit 100 (i.e.

an LD drive circuit) is connected with the electric power source 80 and the CPU 180, so as to receive electric power from the electric power source 80 and supply an operational current to the semiconductor laser diode 30 in response to a control signal supplied from the CPU 180. A current detecting circuit 120 is interposed between the LD drive circuit 100 and the semiconductor laser diode 30.

The LD drive circuit 100 has a soft start function of moderately initiating electric power supply to the semiconductor laser diode 30. Therefore, the semiconductor laser diode 30 is certainly protected against surge voltage. Thus, the operational current of the semiconductor laser diode 30 gradually builds up due to the soft start function of the LD drive circuit 100. The operational current of the semiconductor laser diode 30 is controlled to settle at a predetermined value necessary for emitting laser beam from the semiconductor laser diode 30.

The photo diode accommodated in the semiconductor laser diode 30 generates a signal representative of the output power of the laser beam entered therein. This signal outputted from the photo diode of the semiconductor laser diode 30 is fed back to the LD drive circuit 100 for feedback control of the operational current of the semiconductor laser diode 30. Namely, when the magnitude of this feedback signal is low, the LD drive circuit increases the operational current of the semiconductor laser diode 30 so as to compensate the drop of laser output power. Although the semiconductor laser 30 generally induces a power drop due to aging, the feedback control circuit described above cancels this power drop automatically and maintains the laser output power at a constant value so as to generate a rated power.

The motor drive circuit 110 receives electric power from the electric power source 80 and generates an actuation signal for the stepping motor 51 in accordance with a control signal from the CPU 180. More specifically, the stepping motor 51 is driven at a low speed of approximately 50 Hz.

The current detecting circuit 120 includes a resistance connected in series with the semiconductor laser diode 30. This current detecting circuit 120 detects the operational current supplied from the LD drive circuit 100 to the semiconductor laser diode 30. A terminal voltage of the current detecting circuit 120, representing the operational current detected, is given to the CPU 180.

An amplifier 130 is connected to the photodetector 70 and serves to amplify an output signal of the photodetector 70. A binary encoding circuit 140 is connected to the amplifier 130 and serves to encode the signal fed from the amplifier 130 into a binary-coded signal. This binary-coded signal is supplied to the CPU 180.

A bar code discriminating circuit 150 is provided between the binary encoding circuit 140 and the CPU 180. The bar code discriminating circuit 150 consists of a retrigger-type monostable multivibrator 150a (referred to as a R-MM, hereinafter) and a 4-bit binary counter 150b. The R-MM 150a is connected to the binary encoding circuit 140 so as to receive the binary-coded signal as a trigger signal. The R-MM 150a generates a bar code discrimination signal which builds up upon reception of the binary-coded signal and is, in turn, held at a high level during a predetermined time constant τ. The R-MM 150a generates this bar code discrimination signal every time the binary-coded signal is supplied from the binary encoding circuit 140. The time constant τ of the R-MM 150a is determined by a capacitor C and a resistance R associated together with the R-MM 150a. A monostable multivibrator 74LS123 of Texas Instruments, Inc. will be suitable for the R-MM 150a used in this embodiment.

The binary counter 150b has an inverse reset terminal RES which receives a reset signal fed from the CPU 180, and a clock terminal CK connected with an output terminal of the R-MM 150a. The binary counter 150b is therefore reset in response to the reset signal of the CPU 180, and initiates counting the number of high-levels of the bar code discrimination signal inputted from the clock terminal CK. The binary counter 150b has an output terminal Qb whose output signal is supplied to the CPU 180 as a counter output signal. In more detail, the output terminal Gb corresponds to an output terminal of a second bit from the lowest bit LSB of the 4-bit binary counter 150b. In this case, the reset signal fed from the CPU 180 is produced every time the trigger switch 200 is depressed to generate the mirror scanning signal. A binary counter 74LS393 of Texas Instruments, Inc. will be suitable for the binary counter 150b used in this embodiment.

This bar code discriminating circuit 150 is constituted to detect characteristic features of the bar code data. The bar code data is generally characterized in that a black bar (i.e. a data portion) and a white space appear alternately at short intervals. Therefore, a distinctive pattern having a large contrast ratio will continue for a while when the bar code is detected. Furthermore, the bar code has marginal portions at both ends thereof. The width of these marginal portions are normally determined in compliance with a standard for bar codes.

The time constant τ of the bar discriminating circuit 150 is determined in the following manner. The time constant τ is larger than a time required for scanning adjacent two black bars sandwiching one white space therebetween, and is smaller than a summation of the above time and a time required for scanning marginal portions of the bar code. With this arrangement, a single bar code discrimination signal is generated by the retrigger of the R-MM 150a during one scanning operation so as to specify a single bar code. Accordingly, generation of a plurality of bar code discrimination signals from the R-MM 150a during one scanning operation indicates that the same number of a plurality of bar codes are scanned.

As a result, when the 4-bit binary counter 150b has "1" as a value of a second bit from the lowest LSB, it is concluded that the binary counter 150b has received two or more bar code discrimination signals from the R-MM 150a. On the other hand, when the 4-bit binary counter 150b has "0" as the value of the second bit from the lowest LSB, it is concluded that the binary counter 150b has received only one bar code discrimination signal from the R-MM 150a. Accordingly, an output from the output terminal Qb of the binary counter 150b can be directly used to make a judgement as to whether the number of bar code discrimination signals generated from the R-MM 150a is one or more.

The CPU 180 executes a computer program according to the flowchart shown in FIGS. 3, 4, and 7–10, on the basis of the signals fed from the trigger switch 200, the binary encoding circuit 140, and the bar code discriminating circuit 150.

During this execution of the computer program, the CPU 180 performs controls of the LD drive circuit 100 and the motor drive circuit 110, as well as calculations necessary for outputting data. The computer program is pre-memorized in the ROM 190 associated with the CPU 180.

Figure 3:
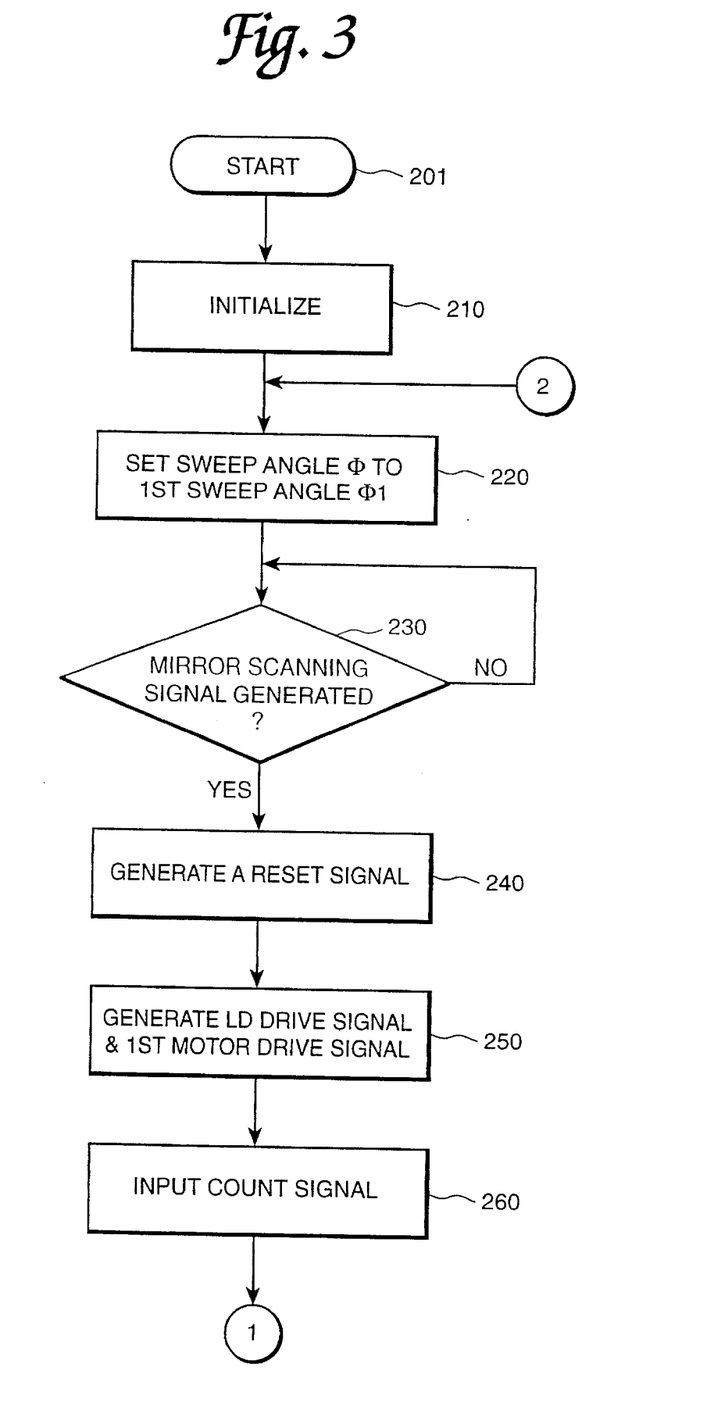
FIG. 3 is a part of a flowchart showing a laser beam sweep angle changing operation in accordance with the present invention.

Next, a laser beam sweep angle changing operation in accordance with the present invention will be explained with reference to the flowchart of FIGS. 3 and 4.

In a step 201, the CPU 180 starts the laser beam sweep angle changing operation. After finishing initialization in a step 210, the CPU 180 proceeds to a step 220 to set a sweep angle $\Phi$ of the mirror 52 to a first sweep angle $\Phi 1$. This first sweep angle $\Phi 1$ represents a larger sweep angle, which corresponds to a swing angle $\pm \theta 1$ of the mirror 52. This first sweep angle $\Phi 1$ is memorized in the ROM 190 in advance.

The CPU 180 thereafter makes a judgement in a step 230 as to whether or not the mirror scanning signal is generated. If the judgement in the step 230 is NO, the CPU 180 repeats the step 230 until the mirror scanning signal is generated.

In this condition, the hand-held scanner S is held by an operator so that the window 11 of the head portion 10a faces toward the bar code 90. Then, the operator depresses the trigger switch 200. In response to this depression of the trigger switch 200, a mirror scanning signal is generated as indicated by a reference symbol A in the time chart of FIG. 5. The CPU 180 responds to this mirror scanning signal A and proceeds to a step 240 to generate a reset signal which is required for resetting the binary counter 150b. Next, the CPU 180 proceeds to a step 250 to generate an LD drive signal and a first motor drive signal. The LD drive signal is required for emitting a laser beam from the semiconductor laser diode 30. The first motor drive signal is required for rotating the stepping motor 51 in normal and reverse directions within a predetermined rotational angle corresponding to the first sweep angle $\Phi 1$.

Upon receipt of the reset signal fed from the CPU 180, the binary counter 150b is reset. Furthermore, the LD drive circuit 100 receives electric power from the electric power source 80 and supplies an operational current to the semiconductor laser diode 30 in response to the LD drive signal fed from the CPU 180. The semiconductor laser diode 30 thus initiates emitting a laser beam toward the collimator lens 40. The laser beam is collimated by the collimator lens 40 and then transmitted to the swing mirror 52 of the optical scanning mechanism 50.

Figure 6:
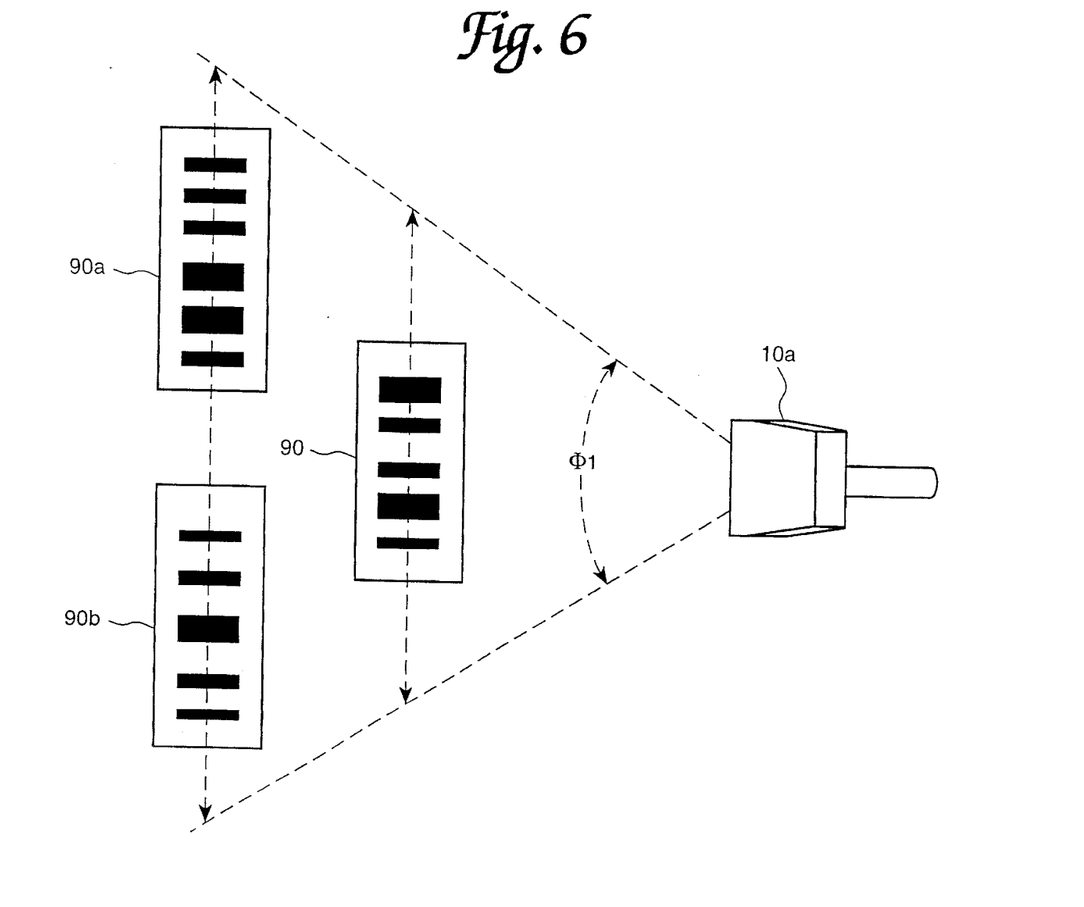
FIG. 6 is a view illustrating the scanning operation of a laser beam emitted from a hand-held portable scanner in accordance with the present invention.

Meanwhile, the motor drive circuit 110 receives electric power from the electric power source 80 and supplies an operational current to the stepping motor 51 in response to the first motor drive signal fed from the CPU 180. Thus, the stepping motor 51 initiates a reciprocative sweep motion of the swing mirror 52 at a low-frequency speed. Therefore, in response to the activation of the stepping motor 51, the laser beam reflected at the mirror 52 causes one reciprocative sweep motion within the first sweep angle $\Phi 1$ as shown in FIG. 6.

During this one scanning operation the mirror 52 receives a bar code laser beam including bar code information, which is a returning laser beam having been reflected at the bar code 90 and passed through the window 11. This bar code laser beam, after reflected at the mirror 52, enters into the converging lens 60. The bar code laser beam is thereafter converged by the converging lens 60 and received by the photodetector 70.

The photodetector 70 generates a light detecting signal representing a light quantity of the bar code laser beam converged by the converging lens 60. In this case, the light detecting signal varies in accordance with the reflective ratio of bar code 90. More specifically, the reflective ratio with respect to the laser beam is different between the bar portion and the space portion. Accordingly, this difference of the reflective ratio varies the magnitude of the light detecting signal. The light detecting signal, generated from the photodetector 70, is then amplified in the amplifier 130. An output signal of the amplifier 130 is supplied to the binary encoding circuit 140 and, then, converted into a binary-coded signal as indicated by a reference symbol B1 in FIG. 5. This binary-coded signal B1 is thereafter supplied to the R-MM 150a and the CPU 180.

Figure 5:
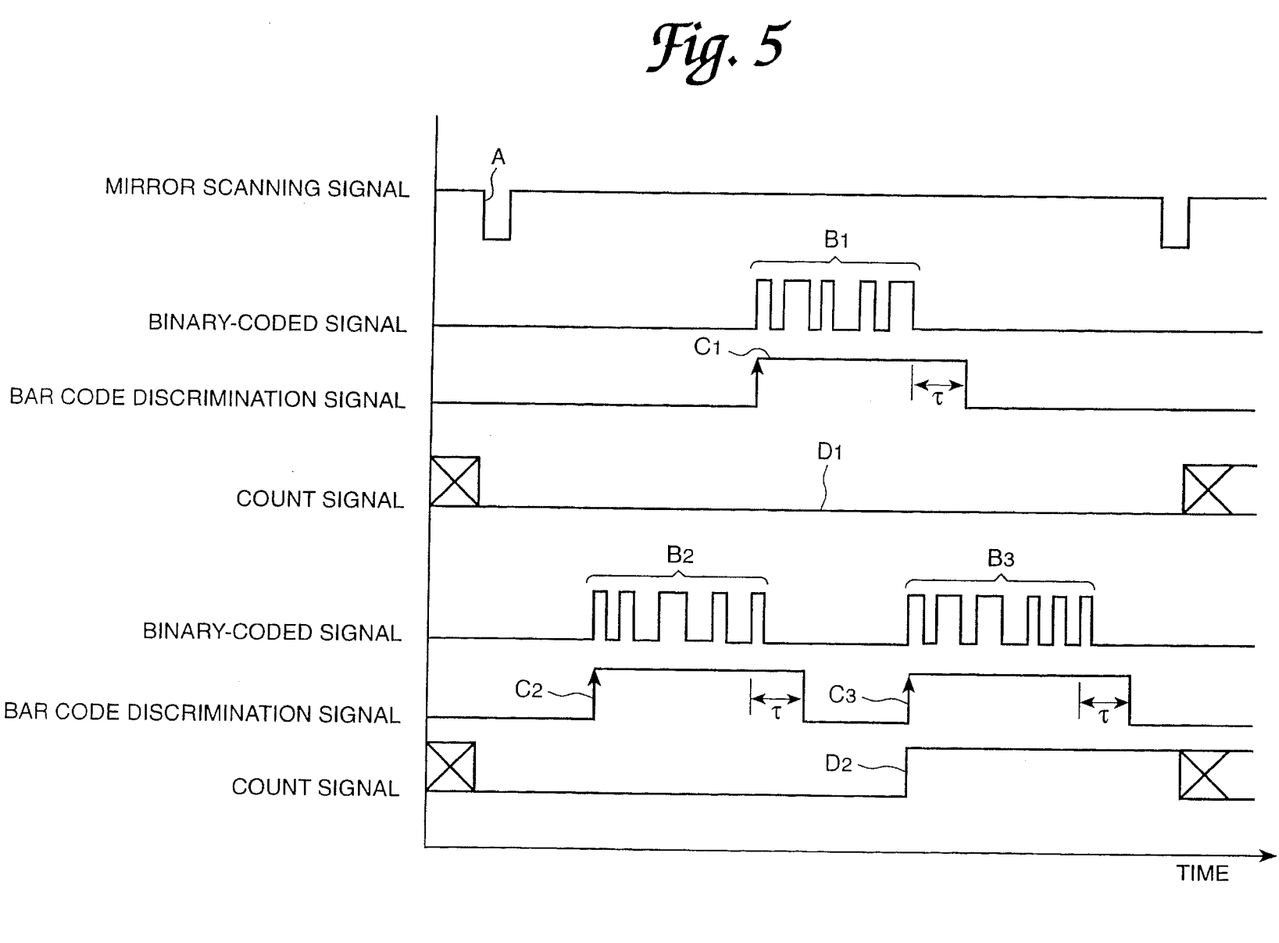
FIG. 5 is a time chart showing various signal waveforms in accordance with the present invention.

A building-up of the binary-coded signal triggers the R-MM 150a and the bar code discrimination signal is generated as indicated by a reference symbol C1 in FIG. 5. The R-MM 150a is newly triggered every when the binary-coded signal B1 builds up so that the bar code discrimination signal C1 is continuously generated. If the building-up of the binary-coded signal B1 is ceased, the bar code discrimination signal C1 decreases to a low level after the time constant $\tau$ has elapsed. In this instance, the count number of the binary counter 150b is "1" The output terminal Qb of the binary counter 150b, therefore, generates a count signal of "0", as indicated by a reference symbol D1 in FIG. 5.

The CPU 180 inputs this count signal in a step 260. Then, the CPU 180 proceeds to a step 270 to make a judgement as to whether or not the number of the bar codes is equal to or more than 2. As the count signal is "0" in the step 260, only one bar code is detected in this case. Hence, the judgement of the step 270 becomes NO. The CPU 180, next, proceeds to a step 280 to generate the LD drive signal and the first motor drive signal again.

Thus, in the same manner as the previous procedure, the stepping motor 51 initiates a reciprocative sweep motion of the swing mirror 52 at a low-frequency speed. In response to the activation of the stepping motor 51, the laser beam, having passing through the collimator lens 40 and been reflected at the mirror 52, causes one reciprocative sweep motion within the first sweep angle $\Phi 1$ as shown in FIG. 6. The laser beam is thus transmitted through the window 11 of the casing 10 toward the bar code 90 so as to scan the bar code 90.

During this one scanning process, the mirror 52 receives a bar code laser beam having been reflected at the bar code 90 and passed through the window 11. This bar code laser beam, after being reflected at the mirror 52, enters into the converging lens 60. The bar code laser beam is thereafter converged by the converging lens 60 and received by the photodetector 70.

The photodetector 70 generates a light detecting signal representing a light quantity of the bar code laser beam converged by the converging lens 60. The light detecting signal, generated from the photodetector 70, is then amplified in the amplifier 130. Then, the binary encoding circuit 140 converts the light detecting signal into a binary-coded signal. This binary-coded signal is thereafter supplied to the CPU 180.

Next, in a step 310, the CPU 180 reads the binary-coded signal and performs an ordinary bar code decode process. In this bar code decode process, the CPU 180 digitizes respective bars and spaces of the bar code 90 on the basis of their widths. Then, the bar code information of the bar code 90 is decoded on the basis of the combination of digitized data.

After the decode process, the CPU 180 proceeds to a step 320 to output a decoded data.

Now let us suppose that two bar codes 90a and 90b shown in FIG. 6 are scanned instead of the single bar code 90 in the procedure of the step 250. In this case, the photodetector 70 successively generates the light detecting signal in response to the bar code laser beam from respective bar codes 90a and 90b. The amplifier circuit 130 amplifies these light detecting signals, and the binary encoding circuit 140 converts the amplified light detecting signals into binary-coded signals as indicated by B2 and B3 in FIG. 5. The binary-coded signals B2 and B3 are thereafter supplied to the R-MM 150a and the CPU 180.

A building-up of the first binary-coded signal B2 triggers the R-MM 150a and a first bar code discrimination signal is generated as indicated by a reference symbol C2 in FIG. 5. The R-MM 150a is newly triggered every time the first binary-coded signal B2 builds up so that the first bar code discrimination signal C2 is continuously generated. If the building-up of the first binary-coded signal B2 is ceased, the first bar code discrimination signal C2 decreases to a low level after the time constant τ has elapsed.

Subsequently, a building-up of the second binary-coded signal B3 triggers the R-MM 150a and a second bar code discrimination signal is generated as indicated by a reference symbol C3 in FIG. 5. The R-MM 150a is newly triggered every time the second binary-coded signal B3 builds up so that the second bar code discrimination signal C3 is continuously generated. If the building-up of the second binary-coded signal B3 is ceased, the second bar code discrimination signal C3 decreases to a low level after the time constant τ has elapsed.

In this instance, the count number of the binary counter 150b is "2". The output terminal Qb of the binary counter 150b, therefore, generates a count signal of "1", as indicated by a reference symbol D2 in FIG. 5.

The CPU 180 inputs this count signal in the step 260. Then, the CPU 180 proceeds to the step 270 to make a judgement as to whether or not the number of bar codes is equal to or more than 2. As the count value is "1" in the step 260, a plurality of bar codes are detected in this case. Hence, the judgement of the step 270 becomes YES in the step 270. The CPU 180, thus, proceeds to a step 290 to set the sweep angle Φ of the mirror 52 to a second sweep angle Φ2. This second sweep angle Φ2 represents a smaller sweep angle, which corresponds to a swing angle ±θ2 of the mirror 52 and is memorized in the ROM 190 in advance. The swing angle θ2 is smaller than θ1. Next, the CPU 180 proceeds to a step 300 to generate the LD drive signal and a second motor drive signal.

Thus, in response to the second motor drive signal, the stepping motor 51 initiates a reciprocative sweep motion of the swing mirror 52 at a low-frequency speed. In response to the activation of the stepping motor 51, the laser beam, having been emitted from the semiconductor laser diode 30 and passed through the collimator lens 40, is reflected at the mirror 52. The laser beam causes one reciprocative sweep motion within the second sweep angle θ2. The laser beam is thus transmitted through the window 11 of the casing 10 toward the bar code 90a or 90b so as to scan the bar code 90a or 90b.

During this one scanning process, the mirror 52 receives a bar code laser beam having been reflected at the bar code 90a or 90b and passed through the window 11. This bar code laser beam, after reflected at the mirror 52, enters into the converging lens 60. The bar code laser beam is thereafter converged by the converging lens 60 and received by the photodetector 70.

The photodetector 70 generates a light detecting signal representing a light quantity of the bar code laser beam converged by the converging lens 60. The light detecting signal, generated from the photodetector 70, is then amplified in the amplifier 130. Then, the binary encoding circuit 140 converts the light detecting signal into a binary-coded signal. This binary-coded signal is thereafter supplied to the CPU 180. In this case, as the second sweep angle Φ2 is smaller than the first sweep angle Φ2, the laser beam scans either the bar code 90a or the bar code 90b. Accordingly, the binary-coded signal supplied from the binary encoding circuit 140 can identify either one of the bar codes 90a and 90b.

Next, in the step 310, the CPU 180 reads the binary-coded signal and performs the ordinary bar code decode process. In this bar code decode process, the CPU 180 digitizes respective bars and spaces of the bar code 90a or 90b on the basis of their widths. Then, the bar code information of the bar code 90a or 90b is decoded on the basis of the combination of digitized data. After the decode process, the CPU 180 proceeds to the step 320 to output a decoded data.

As explained in the foregoing description, if only one bar code is detected in a trial scanning operation by the first sweep angle Φ1, the scanning operation for reading information from the bar code is carried out by the same sweep angle Φ1. On the contrary, if two bar codes are detected in the trial scanning operation by the first sweep angle Φ1, the scanning operation for reading information from the bar code is carried out by the smaller sweep angle Φ2.

In other words, the number of bar codes is automatically detected in the trial scanning. If the number of the bar codes is two or more, the sweep angle Φ of the mirror 52 is automatically reduced to a smaller sweep angle Φ2 so as to scan only one bar code.

Therefore, even if there is a significant long distance between the hand-held scanner S and the bar code to be scanned, it is possible to aim only one bar code among a plurality of bar codes. As a result, each bar code can be read separately and correctly.

Although the present embodiment switches the sweep angle Φ of the mirror 52 between two, Φ1 and Φ2, angles. It is needless to say that the sweep angle Φ can be changed more finely.

Figure 7:
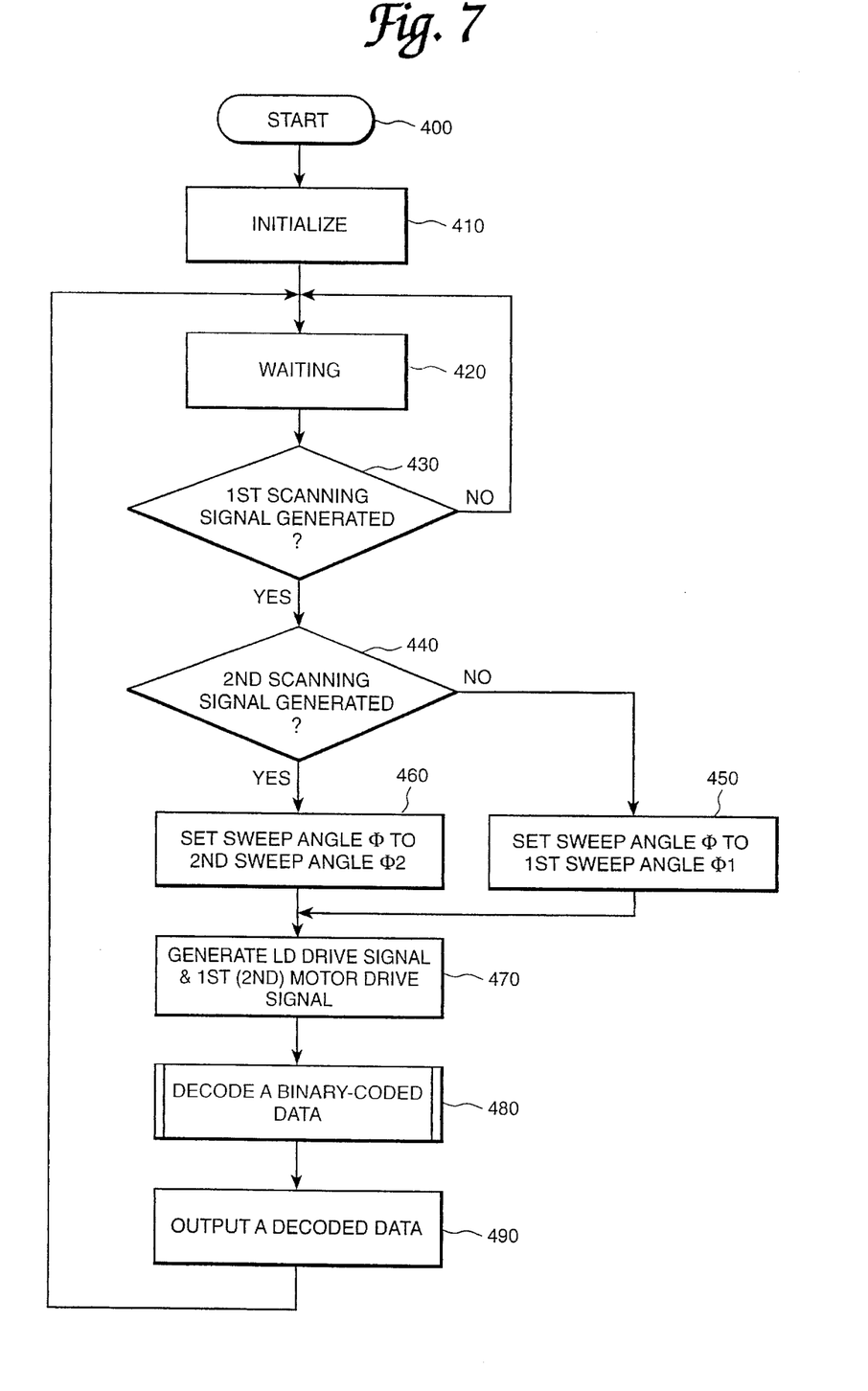
FIG. 7 is a flowchart showing another laser beam sweep angle changing operation in accordance with the present invention.

Next, another embodiment of the laser beam sweep angle changing operation will be explained with reference to FIG. 7. This alternative embodiment is characterized in that the bar code discrimination circuit 150 is omitted from the electric control circuit E of FIG. 1 and the trigger switch 200 is constituted to generate a plurality of different mirror scanning signals. The trigger switch 200 is a two-motion type push switch, wherein a first mirror scanning signal is generated in response to a first push motion of the trigger switch 200 and subsequently a second mirror scanning signal is generated in response to a second push motion of the trigger switch 200. Namely, this two-motion type trigger switch 200 serves as a specifying means for specifying a scanning angle to be scanned in the scanning operation by the optical scanning means.

The CPU 180 serves as a control means for regulating the sweep angle of the laser beam on the basis of the scanning angle specified by the specifying means. More specifically, the CPU 180 executes a computer program defined by the flowchart of FIG. 7 instead of the program defined by the flowchart of FIGS. 3 and 4. The computer program defined by the flowchart of FIG. 7 is memorized in the ROM 190 in advance. It is noted that the first and second mirror scanning signals in this alternative embodiment directly correspond to the first and second sweep angles Φ1 and Φ2 in the previous embodiment, respectively.

After starting this operation in s step 400, the CPU 180 initializes data in a step 41a, and the CPU 180 proceeds to a step 420 to maintain a waiting condition. Namely, the CPU 180 makes a judgement in a step 430 as to whether or not the first scanning signal is generated by the first push motion of the trigger switch 200. The CPU 180 repeats the procedure of the steps 420 and 430 until the judgement of the step 430 becomes YES.

If the judgement of the step 430 becomes YES, the CPU 180 proceeds to a step 440 to further make a judgement as to whether or not the second scanning signal is generated by the trigger switch 200. If the second scanning signal is not generated yet, the CPU 180 proceeds to a step 450 to set the sweep angle Φ of the mirror 52 to the first sweep angle Φ1. Thereafter, the CPU 180 proceeds to a step 470 to generate the LD drive signal and the first motor drive signal in the same manner as the step 250 in the previous embodiment.

In response to the LD drive signal from the CPU 180, the LD drive circuit 110 activates the semiconductor laser diode 30 to emit a laser beam. The emitted laser beam is collimated in the collimator lens 40 and is reflected at the mirror 52. Meanwhile, the motor drive circuit 120 receives the first motor drive signal supplied from the CPU 180 and actuates the stepping motor 51 at a low-frequency speed in normal and reverse directions in response to the first motor drive signal. The mirror 52 causes a reciprocative swing motion within the first sweep angle Φ1 in accordance with the normal and reverse rotations of the stepping motor 51. In this case, the window 11 of the hand-held scanner S is faced toward the bar code 90.

In the case where the window 11 of the hand-held scanner S is faced toward the bar codes 90a and 90b, the trigger switch 200 is depressed further to generate the second mirror scanning signal. When the CPU 180 makes the judgement of the step 440, the judgement becomes YES in this case. The CPU 180 proceeds to a step 460 to set the sweep angle Φ of the mirror 52 to the second sweep angle Φ2.

Thereafter, the CPU 180 proceeds to the step 470 to generate the LD drive signal and the second motor drive signal in the same manner as the step 300 in the previous embodiment. In response to the LD drive signal from the CPU 180, the LD drive circuit 110 activates the semiconductor laser diode 30 to emit a laser beam. The emitted laser beam is collimated in the collimator lens 40 and is reflected at the mirror 52. Meanwhile, the motor drive circuit 120 receives the second motor drive signal supplied from the CPU 180 and actuates the stepping motor 51 at a low-frequency speed in normal and reverse directions in response to the second motor drive signal. The mirror 52 causes a reciprocative swing motion within the second sweep angle Φ2 in accordance with the normal and reverse rotations of the stepping motor 51. In this case, the window 11 of the hand-held scanner S is faced toward the bar code 90a or 90b.

Next, in a step 480, the CPU 180 reads the binary-coded signal and performs the ordinary bar code decode process. In this bar code decode process, the CPU 180 digitizes respective bars and spaces of the bar code 90 (90a or 90b) on the basis of their widths. Then, the bar code information of the bar code 90 (90a or 90b) is decoded on the basis of the combination of digitized data. After this decode process, the CPU 180 proceeds to a step 490 to output a decoded data.

As explained in the foregoing description, if the number of the bar code to be read is only one, the trigger switch 200 is operated by the first push motion so as to cause the first mirror scanning signal. In response to this first mirror scanning signal, the laser beam reflected at the mirror 52 sweeps this single bar code within the first sweep angle Φ1.

On the contrary, if the number of the bar codes to be read is two, the trigger switch 200 is operated by the second push motion so as to cause the second mirror scanning signal. In response to this second mirror scanning signal, the laser beam reflected at the mirror 52 sweeps either one of these two bar codes within the second sweep angle Φ2 which is smaller than the first sweep angle Φ1.

In other words, the push motion of the trigger switch 200 is selected in accordance with the number of bar codes to be read. Accordingly, the sweep angle Φ of the mirror 52 is automatically switched between the two, Φ1 and Φ2, sweep angles so as to scan only one bar code.

Therefore, even if there is a significant long distance between the hand-held scanner S and the bar code to be scanned, it is possible to aim only one bar code among a plurality of bar codes. As a result, each bar code can be read separately and correctly.

According to this alternative embodiment, the switching of the scanning operation is simply done by differentiating the depression amount of the trigger switch 200. This will greatly improve an operability of the hand-held scanner S.

Although the trigger switch 200 is explained as a two-motion type push switch, it is needless to say that more than two motion steps can be provided in this trigger switch 200. Furthermore, it will be desirable that a pair of trigger switches generating the first and second mirror scanning signals respectively is provided instead of the single trigger switch of two-motion type push switch.

Figure 8:
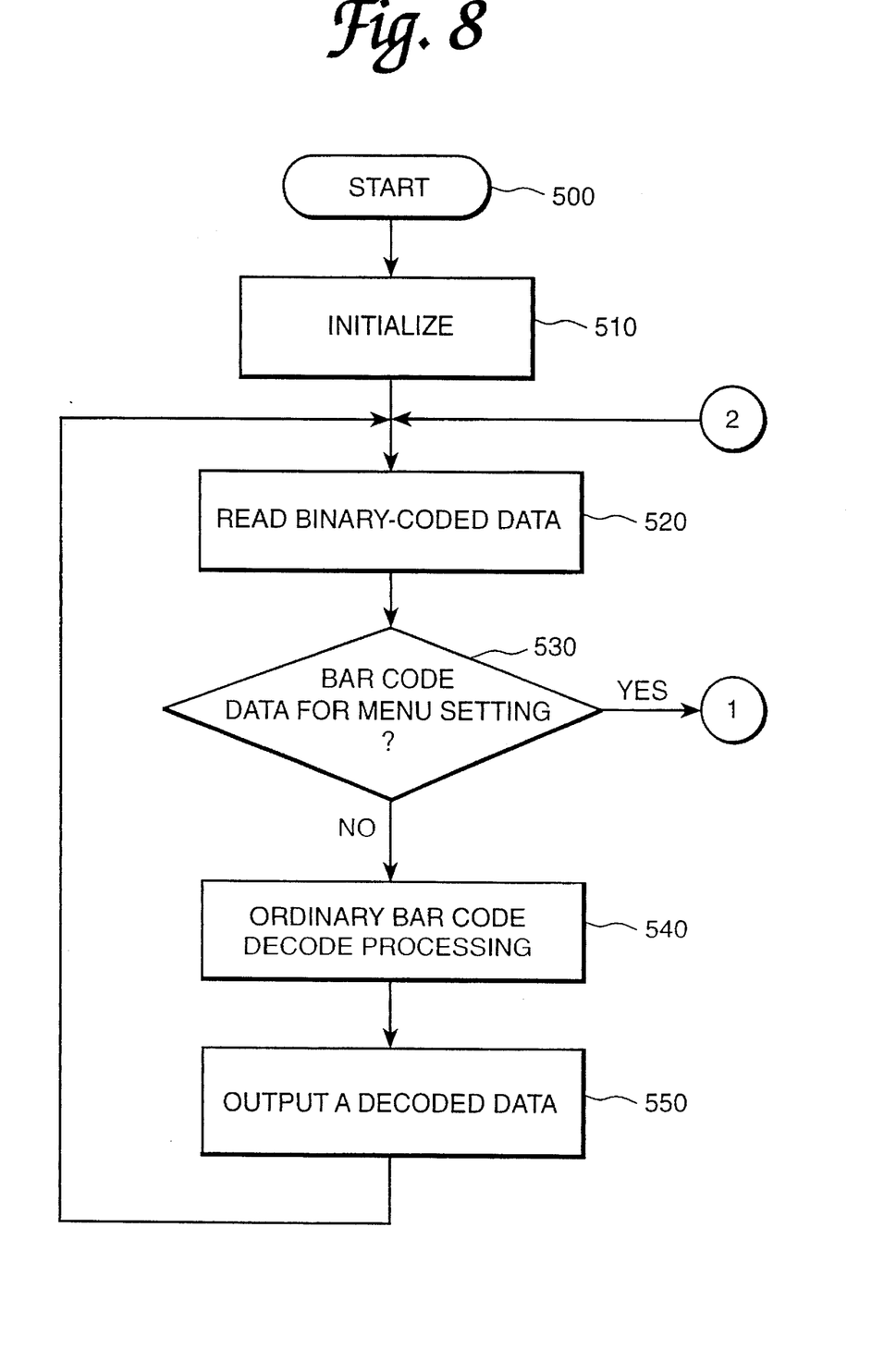
FIG. 8 is a part of a flowchart showing a semiconductor laser deterioration detecting operation in accordance with the present invention.

Next, a semiconductor laser deterioration detecting operation in accordance with the present invention will be explained with reference to the flowchart of FIGS. 8 and 9. After starting the computer program in s step 500, the CPU 180 proceeds to a step 510 to initialize data. In this initialization step, the CPU 180 supplied a drive signal to the LD drive circuit 100. In response to the drive signal, the LD drive circuit 100 supplies electric power from the electric power source 80 to the semiconductor laser 30 through the current detecting circuit 120 so as to increase an operational current of the semiconductor laser diode 30 gradually according to its soft start function. The operational current is controlled to converge or settle to the predetermined value required for emitting a laser beam from the semiconductor laser 30.

The laser beam emitted from the semiconductor laser diode 30 is entered into the collimator lens 40, wherein the laser beam is collimated. The laser beam is then reflected at the mirror 52.

Meanwhile, the current detecting circuit 120 detects an operational current supplied from the LD drive circuit 100 to the semiconductor laser diode 30 as a detected terminal voltage. This detected terminal voltage is fed to the CPU 180.

The photo diode accommodated in the semiconductor laser diode 30 generates a light detecting signal representative of the output power of the laser beam entered therein. This signal outputted from the photo diode of the semiconductor laser diode 30 is fed back to the LD drive circuit 100 for feedback control of the operational current. Namely, when the magnitude of this feedback signal is lowered, the LD drive circuit 100 increases the operational current of the semiconductor laser diode 30 so as to compensate the drop of laser output power. Although aging of the semiconductor laser 30 induces the power drop, the feedback control circuit above described cancels this power drop and maintains the laser output power at a constant value so as to generate a rated power.

When the CPU 180 supplies a drive signal to the motor drive circuit 110, the motor drive circuit 110 causes the stepping motor 51 to rotate in normal and reverse directions at a low-frequency speed. Thus, the mirror 52 initiates a reciprocative sweep motion in accordance with the normal and reverse rotations of the stepping motor 51. The mirror 52 receives the laser beam transmitted from the collimator lens 40 and reflects it toward the bar code 90 through the window 11 of the casing 10. As a result of the scanning operation on the bar code, the bar code laser beam is returned through the window 11 and reflected at the mirror 52. The bar code laser beam reflected at the mirror 52 is then guided to the converging lens 60 and, in turn, focuses onto the photodetector 70.

The photodetector 70 generates a light detecting signal representative of a light quantity of the bar code laser beam converged by the converging lens 60. The light detecting signal, generated from the photodetector 70, is then amplified in the amplifier 130. An output signal of the amplifier 130 is supplied to the binary encoding circuit 140 and, then, converted into a binary-coded signal. This binary-coded signal is thereafter supplied to the CPU 180.

The CPU 180 reads the binary-coded signal in a step 520, and proceeds to a step 530 to make a judgement as to whether or not the bar code data read in the step 520 is identical with a menu setting bar code data. This menu setting bar code data is specially prepared and stored in the ROM 190.

Figure 4:
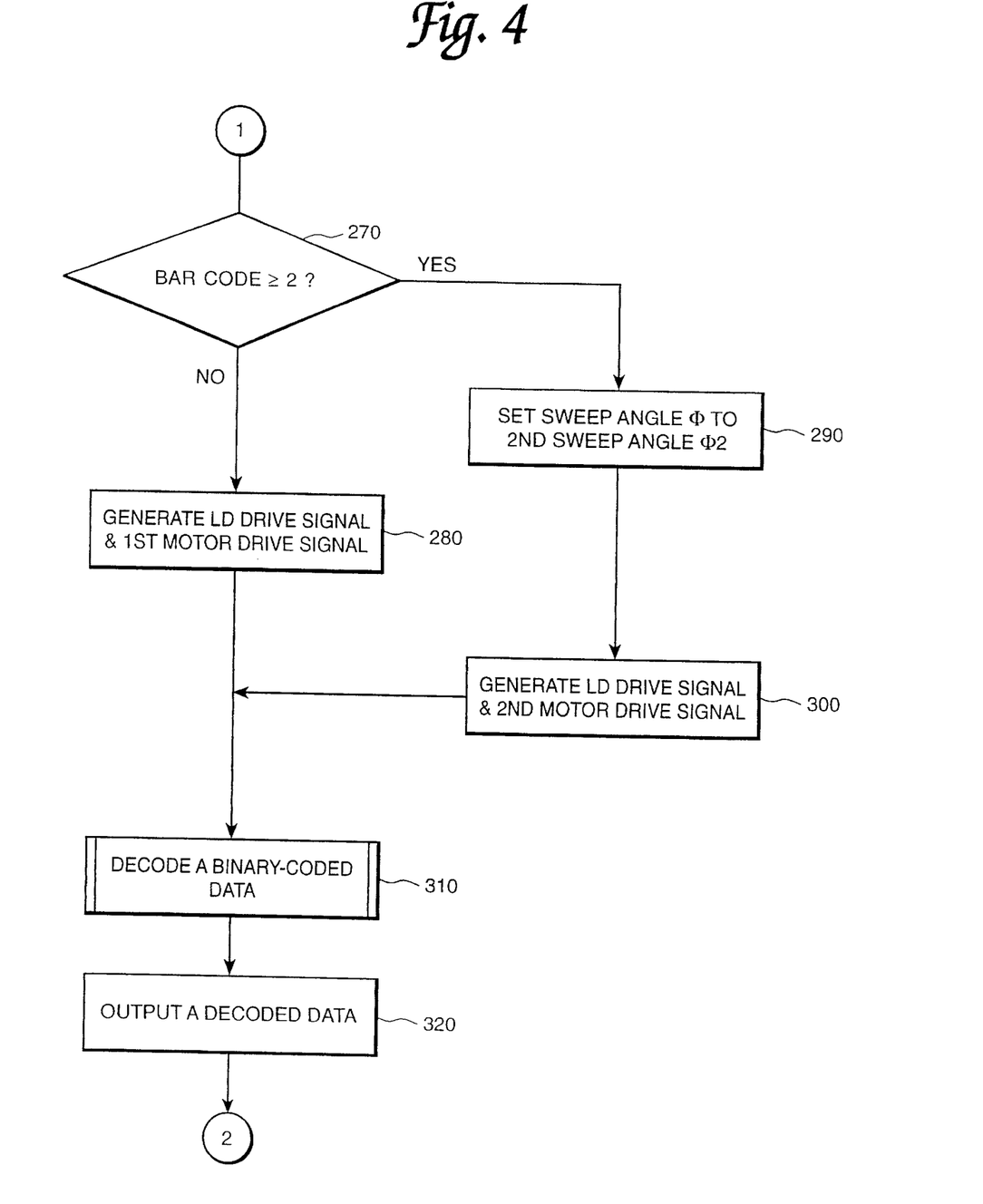
FIG. 4 is a remaining part of the flowchart of FIG. 3.

If the bar code data read in the step 520 is an ordinary one, the CPU proceeds to a step 540 to execute the ordinary bar code decode process in the same manner as the step 310 of FIG. 4. Subsequently, the CPU 180 proceeds to a step 550 to output a decoded data.

If the judgement of the step 530 is YES, the CPU 180 proceeds to a step 560 to execute a system setting mode processing. This system setting mode processing includes a plurality of modes. One of these modes is a current measuring mode wherein an operational current of the semiconductor laser diode 30 is measured. Therefore, the CPU 180 proceeds to a step 570 to make a judgement as to whether or not the current measuring mode is selected. If the current measuring mode is selected, the CPU 180 proceeds to a step 580 to input the detected terminal voltage (i.e. analogue data) from the current detecting circuit 120 and convert it into a digital data. Thereafter, the CPU 180 proceeds to a step 590 to further convert the digital data obtained in the step 580 into a corresponding operational current value. This converted operational current value is, for example, converted into an ASCII code and outputted as a current value.

If the output power of the semiconductor laser diode 30 is lowered, the LD drive circuit 100 increases the operational current to the semiconductor laser diode 30 so as to cancel the power drop of the semiconductor laser diode 30 on the basis of the feedback signal fed from the photo diode accommodated in the semiconductor laser diode 30. Increase of the operational current directly indicates that the semiconductor laser diode 30 is deteriorating. Accordingly, the current value data detected in the step 600 is apparently larger than an ordinary current value detected in the normal, i.e. non-deteriorated, condition. Thus, it becomes possible to detect whether or not the semiconductor laser diode 30 is normal or abnormal.

Figure 9:
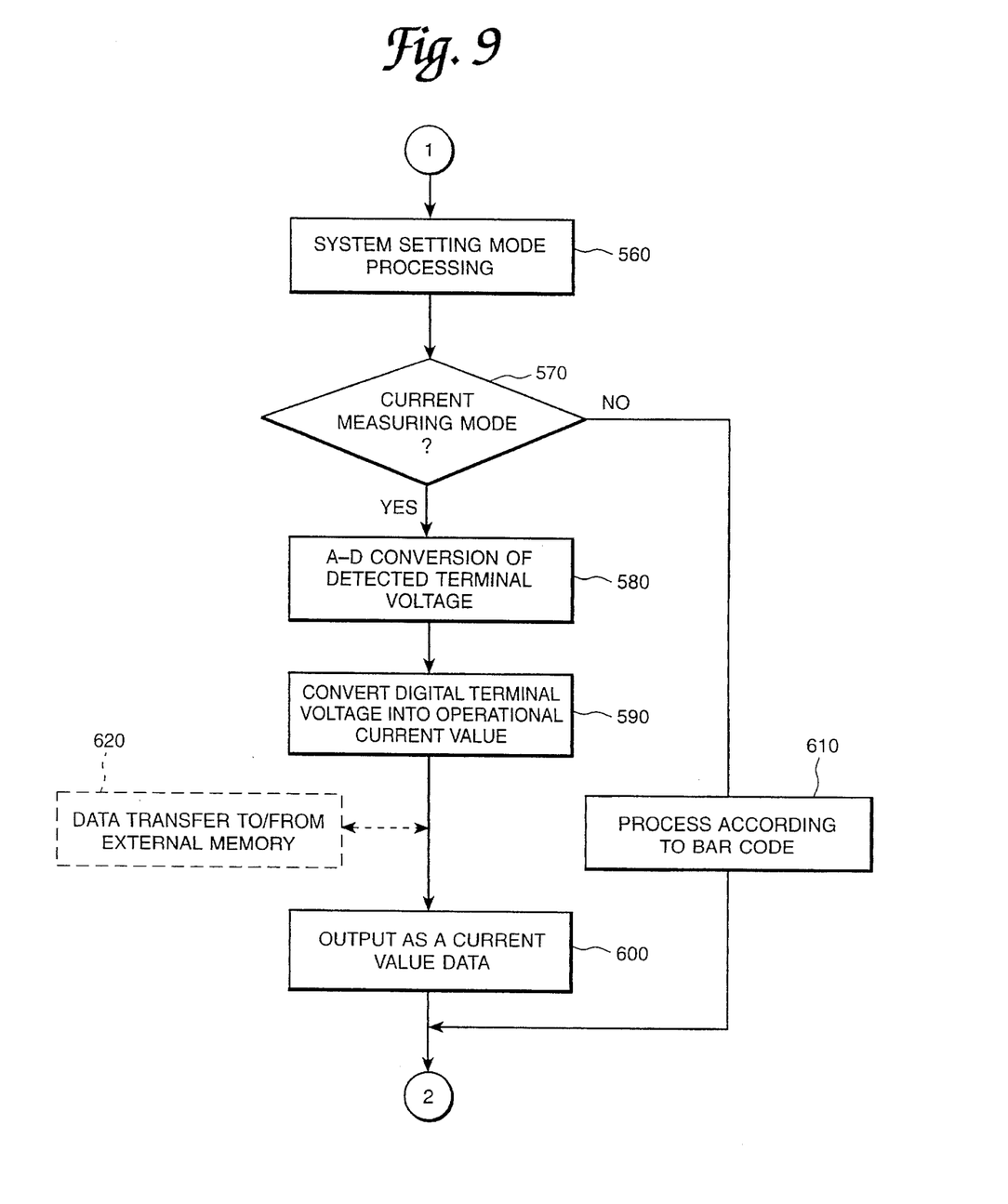
FIG. 9 is a remaining part of the flowchart of FIG. 8.

In a case where the optical information reading apparatus includes an appropriate external memory, it will be preferable to add a step 620 as shown in FIG. 9. That is, in the step 620, the CPU 180 transfers the converted operational current value to the external memory to memorize it therein. It will be preferable to read out the operational current value from the external memory to the CPU 180. It will be also preferable to use an E²PROM included in the apparatus instead of the external memory.

When the judgement in the step 570 is NO, the CPU 180 proceeds to a step 610 to execute a predetermined process according to the bar code data.

As explained in the foregoing description, the present embodiment enables an operator to know of the deterioration of the semiconductor laser diode 30 by simply checking the operational current of the semiconductor laser diode 30 which is feedback-controlled.

Next, an alternative embodiment of the semiconductor laser deterioration detecting operation in accordance with the present invention will be explained.

Figure 11:
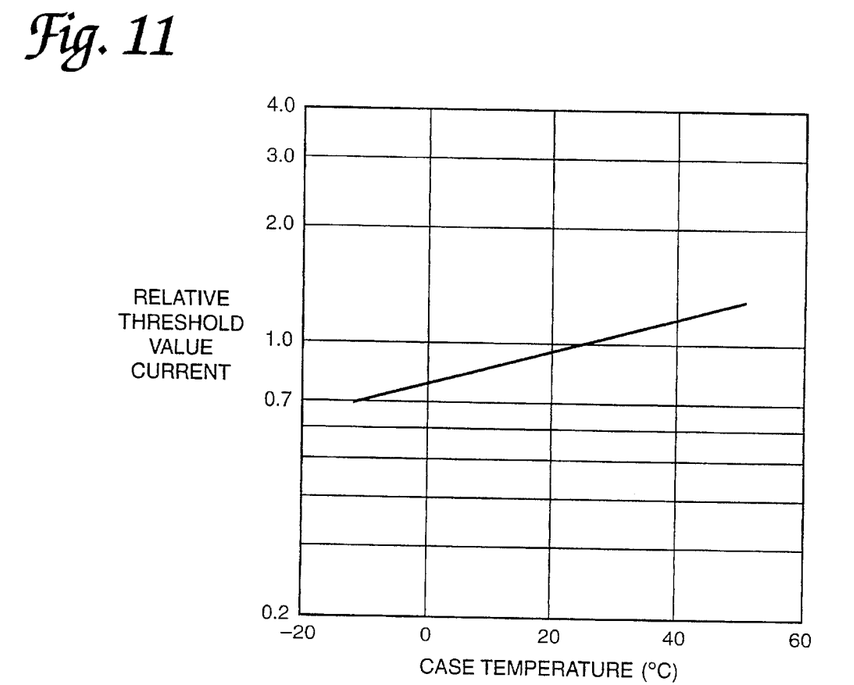
FIG. 11 is a graph showing a relationship between a case temperature of a semiconductor laser and an operational current of a semiconductor laser.
Figure 12:
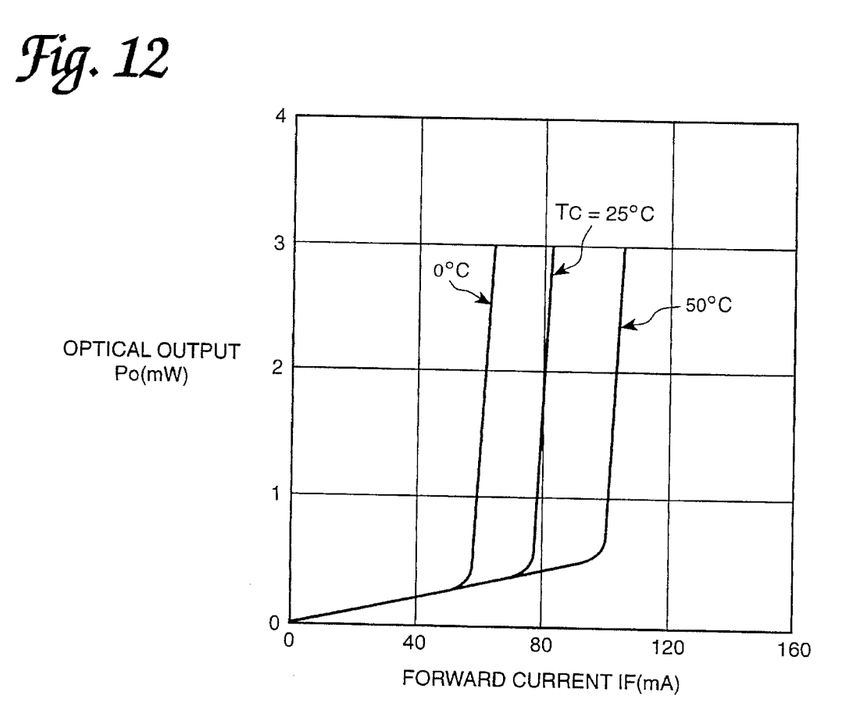
FIG. 12 is a graph showing a relationship between the operational current and an optical output in a semiconductor laser.

As understood from FIG. 11, the operational current (relative threshold value current) of the semiconductor laser diode is generally increased as its case temperature increases. Namely, when required to output a certain optical output, the operational current (forward current) needs to increase as the temperature of the semiconductor laser diode 30 increases, as apparent from FIG. 12.

The alternative embodiment takes account of this temperature dependency of the operational current. There is provided a thermometric element 160 and a temperature detecting circuit 170 together with the components already explained with reference to FIG. 1. The thermometric element 60 is fixed on the casing of the semiconductor laser diode 30 or its vicinity by a silicon adhesive material having low thermal resistance. A detected signal of the thermometric element 160 is fed to the temperature detecting circuit 170 in which the detected signal is converted into a value corresponding to the temperature of the semiconductor laser diode 30.

The ROM 190 stores a coefficient (a) relating to the temperature dependency of the operational current of the semiconductor laser diode 30. The CPU 180 obtains a correction value using this coefficient (a) on the basis of the temperature detected ($T_{op}$). The obtained correction value $a \cdot (T_{ini} - T_{op})$ is added to the operational current value($I_{op}$), where $T_{ini}$ is the initial temperature of the semiconductor laser diode. In this manner, the operational current value is corrected in accordance with the temperature ($T_{op}$) of the semiconductor laser diode 30, as defined by the following equation:

$$I_{op}' = I + \alpha \cdot (T_{ini} - T_{op})$$

wherein $I_{op}'$ is the corrected operation current value;

$I_{op}$ is the actual operational current value;

$\alpha$ is the temperature coefficient;

$T_{ini}$ is the initial temperature of the semiconductor laser diode; and $T_{op}$ is the operational temperature of the semiconductor laser diode.

As the temperature coefficient $\alpha$ is constant while the initial temperature $T_{ini}$ is given beforehand as a referential value, it is only necessary to know that actual operational current value $I_{op}$ and the operational temperature $T_{op}$ for accurately correcting the operational current value. Thus, the correction of the operational current value can be executed very simply.

Figure 10:
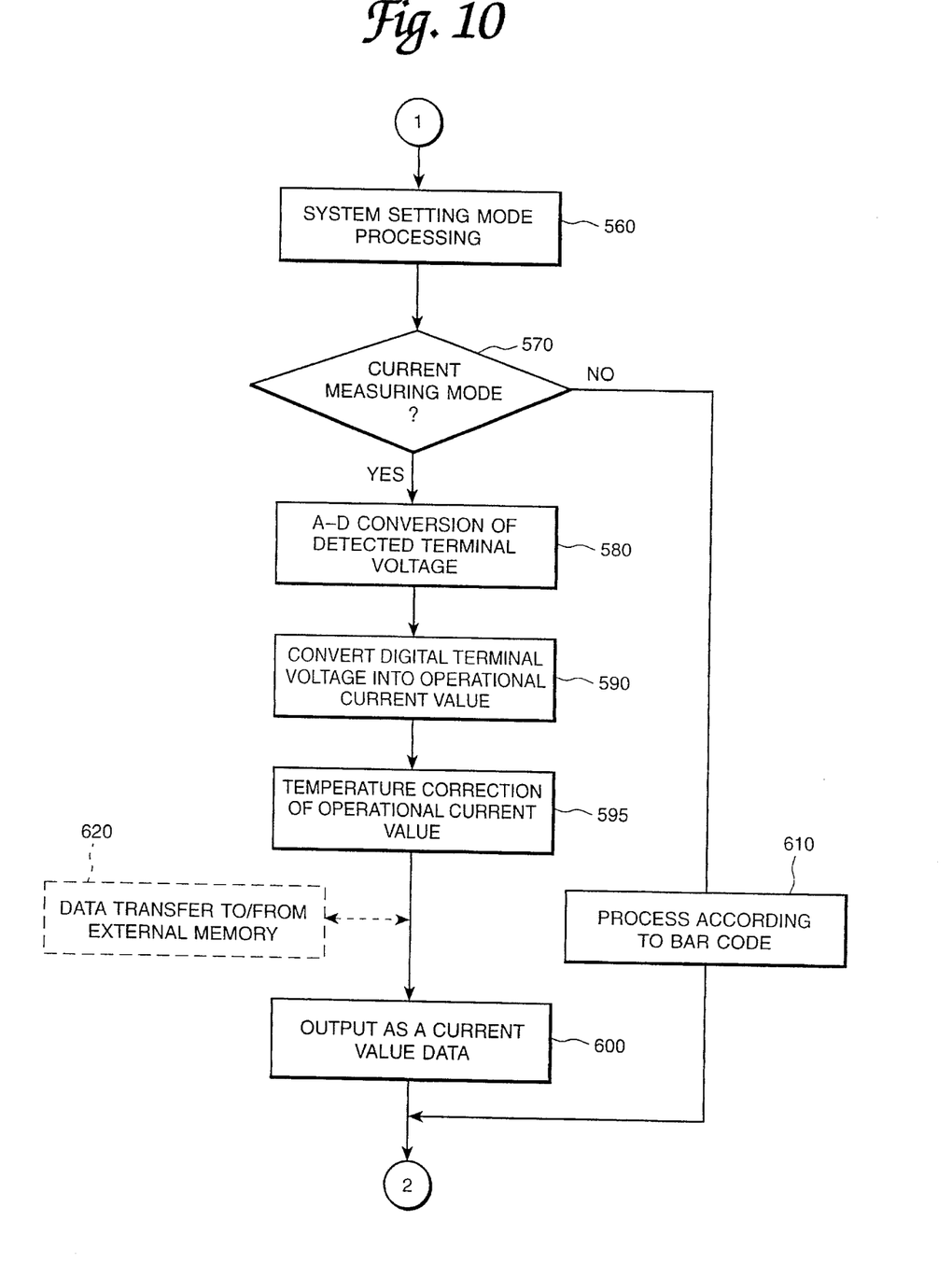
FIG. 10 is a remaining part of the flowchart of FIG. 8 in accordance with another embodiment.

The operation of the CPU 180 will be explained with reference to FIG. 10. The flowchart of FIG. 10 is different from the flowchart of FIG. 9 in that a step 595 is added. In this step 595, the CPU 180 executes the above-described temperature correction of the operational current value.

By adding this step 595, it becomes possible to accurately judging the deterioration of the semiconductor laser diode 30.

By the way, it will be preferable to display the current value data of the step 600 on an appropriate display unit.

Furthermore, it is needless to say that this deterioration detecting operation in accordance with the present invention can be applied to a stationary type optical information reading apparatus as well as a hand-held type optical information reading apparatus.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An optical information reading apparatus monitoring intensity of a laser beam and controlling an operational current so as to maintain a laser output power at a constant value comprising:

a semiconductor laser emitting the laser beam in accordance with said operational current;

optical scanning means for causing the laser beam emitted from said semiconductor laser to scan an information medium;

photo receiving means for receiving a returning laser beam reflected at said information medium;

information reading means for reading out information from said information medium on the basis of said returning laser beam received by said photo receiving means;

sweep angle regulating means for restricting a sweep angle of said laser beam used in a scanning operation of said optical scanning means within a predetermined angle so as to scan only one information medium;

memory means for storing a coefficient representing temperature dependency of said operational current of said semiconductor laser;

operational current detecting means for detecting an actual operational current value of said semiconductor laser, and correcting said actual operational current value based upon a temperature of said semiconductor laser and said coefficient stored in said memory means to produce a corrected operational current value; and output means for generating said corrected operational current value as an information indicating deterioration of said semiconductor laser.

2. An optical information reading apparatus in accordance with claim 1, wherein said operational current detecting means comprises temperature detecting means, provided in the vicinity of said semiconductor laser, for detecting a temperature relating to said semiconductor laser; and current value correcting means for obtaining a correction value corresponding to the temperature detected by said temperature detecting means with reference to said coefficient, and for correcting said actual operational current value using said correction value to obtain said corrected operational current value.

3. An optical information reading apparatus monitoring intensity of a laser beam and controlling an operational current so as to maintain a laser output power at a constant value comprising:

a semiconductor laser emitting the laser beam in accordance with said operational current;

optical scanning means for causing the laser beam emitted from said semiconductor laser to scan an information medium;

photo receiving means for receiving a returning laser beam reflected at said information medium;

information reading means for reading out information from said information medium on the basis of said returning laser beam received by said photo receiving means;

memory means for storing a coefficient representing temperature dependency of said operational current of said semiconductor laser;

operational current detecting means for detecting an actual operational current value of said semiconductor laser, and correcting said actual operational current value based upon a temperature at said semiconductor laser and said coefficient stored in said memory means to produce a corrected operational current value; and output means for generating said corrected operational current value as an information indicating deterioration of said semiconductor laser.

4. An optical information reading apparatus in accordance with claim 3, wherein said operational current detecting means comprises temperature detecting means, provided in the vicinity of said semiconductor laser, for detecting a temperature relating to said semiconductor laser; and current value correcting means for obtaining a correction value corresponding to the temperature detected by said temperature detecting means with reference to said coefficient, and for correcting said actual operational current value using said correction value to obtain said corrected operational current value.

* * * * *